United States Patent [19]
McGillis et al.

[11] Patent Number: 5,548,788
[45] Date of Patent: Aug. 20, 1996

[54] DISK CONTROLLER HAVING HOST PROCESSOR CONTROLS THE TIME FOR TRANSFERRING DATA TO DISK DRIVE BY MODIFYING CONTENTS OF THE MEMORY TO INDICATE DATA IS STORED IN THE MEMORY

[75] Inventors: James M. McGillis, Franklin; Jeffrey M. Lasker, Marlboro, both of Mass.

[73] Assignee: EMC Corporation, Hopkinton, Mass.

[21] Appl. No.: 330,193

[22] Filed: Oct. 27, 1994

[51] Int. Cl.$^6$ .................................................. G06F 13/00
[52] U.S. Cl. .................... 395/851; 395/840; 395/842; 364/238.3; 364/238.6; 364/239.6; 364/248.1; 364/260.1; 364/261; 364/261.2; 364/DIG. 1
[58] Field of Search .................... 395/250, 275, 395/400, 425, 725, 821, 835, 840–842, 845, 440, 851, 375; 364/DIG. 1, DIG. 2

[56] References Cited

U.S. PATENT DOCUMENTS

| | | | |
|---|---|---|---|
| 4,371,929 | 2/1983 | Brann et al. | 395/440 |
| 4,394,732 | 7/1983 | Swenson | 395/440 |
| 4,755,928 | 7/1988 | Johnson et al. | 395/182.04 |
| 4,843,544 | 6/1989 | DuLac et al. | 395/250 |
| 4,870,643 | 9/1989 | Bultman et al. | 395/182.05 |
| 4,922,418 | 5/1990 | Dolecek | 395/800 |
| 4,965,801 | 10/1990 | DuLac | 371/40.1 |
| 4,975,829 | 12/1990 | Clarey et al. | 395/500 |
| 5,101,490 | 3/1992 | Getson, Jr. et al. | 395/835 |
| 5,133,060 | 7/1992 | Weber et al. | 395/440 |
| 5,148,432 | 9/1992 | Gordon et al. | 395/182.05 |
| 5,163,132 | 11/1992 | DuLac et al. | 395/873 |
| 5,175,822 | 12/1992 | Dixon et al. | 395/829 |
| 5,175,825 | 12/1992 | Starr | 395/200.07 |
| 5,179,704 | 1/1993 | Jibbe et al. | 395/735 |
| 5,191,581 | 3/1993 | Woodbury et al. | 370/85.9 |
| 5,206,943 | 4/1993 | Callison et al. | 395/441 |
| 5,233,692 | 8/1993 | Gajjar | 395/309 |
| 5,237,660 | 8/1993 | Weber et al. | 395/250 |
| 5,241,630 | 8/1993 | Lattin, Jr. et al. | 395/287 |
| 5,247,622 | 9/1993 | Choi | 395/294 |
| 5,276,806 | 1/1994 | Sanberg et al. | 395/200 |
| 5,371,855 | 12/1994 | Idleman et al. | 395/250 |
| 5,375,227 | 12/1994 | Akatsu et al. | 395/182.03 |
| 5,390,186 | 2/1995 | Murata et al. | 371/10.1 |
| 5,418,925 | 5/1995 | DeMoss et al. | 395/441 |
| 5,459,856 | 10/1995 | Inoue | 395/440 |

*Primary Examiner*—Meng-Ai T. An
*Attorney, Agent, or Firm*—Weingarten, Schurgin, Gagnebin & Hayes

[57] ABSTRACT

A disk controller and method for transferring data from a host computer to a cache memory of the disk controller and transferring data from the cache memory to disk drives coupled to the disk controller. Received data to be written to disk by the disk controller is stored in a memory within the disk controller. A host I/O processor modifies certain locations within the memory to indicate to a disk I/O processor that the data is in memory and can be written to disk by the disk I/O processor. In this manner intervention of a controller microprocessor is minimized and disk controller performance is improved.

31 Claims, 3 Drawing Sheets

DISK CONTROLLER HAVING HOST PROCESSOR CONTROLS THE TIME FOR TRANSFERRING DATA TO DISK DRIVE BY MODIFYING CONTENTS OF THE MEMORY TO INDICATE DATA IS STORED IN THE MEMORY

FIELD OF THE INVENTION

This invention relates to disk storage subsystems and more particularly to a method and apparatus for transferring data between a host and a disk storage subsystem coupled to the host.

BACKGROUND OF THE INVENTION

Many computer systems often include a host computer and a disk storage subsystem which includes a controller and one or more disk drives.

The disk controller may include a controller microprocessor coupled to a host input/output (I/O) processor, a disk I/O processor and a cache memory. The controller microprocessor generally coordinates and controls the transfer of data from the host computer to the disk storage subsystem and vice-versa.

In a so-called write-through cache disk storage subsystem, data which is transferred between the host and the disks is selectively copied into the cache memory of the disk controller. In this manner, frequently accessed data may be stored in the cache memory. Thus when the host initiates a data request, if the data is stored in the cache memory, the data may be retrieved from the cache memory rather than from a disk drive. Retrieving data from the cache memory avoids the necessity of accessing the disk drive of the disk storage subsystem which is relatively slow compared to the cache memory. Therefore data retrieval is accomplished more rapidly which in turn leads to an overall increase in system performance.

One problem which arises in write-through cache controllers, however, is that when the host computer executes a write-to-disk command, the controller takes a relatively long period of time to store the data in the cache memory, and then subsequently store the data on the respective disk drive or drives. This decreases the data throughput capability of the computer system.

It would, therefore, be desirable to provide a disk controller capable of storing in a cache memory data to be written to or retrieved from one or more disk drives of a disk storage subsystem, while also enabling write operations to the one or more disk drives to be completed rapidly.

SUMMARY OF THE INVENTION

A disk controller is presently disclosed which includes a controller microprocessor, a memory coupled to the controller microprocessor, a host I/O processor having a first port adapted to couple to a host computer and a second port coupled to the controller microprocessor and to the memory. The disk controller further includes a disk I/O processor having a first port adapted to couple to one or more disk drives and having a second port coupled to the controller microprocessor and the memory. The host I/O processor communicates with the disk I/O processor through the memory by altering instructions stored in the memory. In response to a predetermined command received from the host computer, the host I/O processor transfers information to the memory and in response to a control signal provided by the host I/O processor, (i.e. by altering instructions) the disk I/O processor substantially simultaneously transfers data to one or more disk drives of the disk storage subsystem. With this particular arrangement, a disk controller is provided which transfers data between the host computer and a disk storage subsystem without the ongoing intervention of the controller microprocessor thereby minimizing the amount of time which the controller microprocessor commits to directing data transfers between the host computer and the disk storage subsystem. The memory may be provided as a cache memory which is coupled to both the host and disk I/O processors. The transfer of data from the cache memory to the disk drives may immediately follow the transfer of data from the Host I/O processor to the memory thus providing an I/O pipeline operation. As indicated above, the host I/O processor provides an indication to the disk I/O processor that data is available to be transferred to a disk drive of the disk storage subsystem by modifying one or more locations in memory. Since the operations of receiving the data from the host computer and transferring the data to the disk drives may take place in rapid succession, (i.e. with a latency of one disk block) and without ongoing intervention from the controller microprocessor, the latency period between the receipt of data from the host computer and the subsequent transfer of data to the disk storage subsystem is minimized. The disk drives may include, for example, a redundant array of inexpensive disks (RAID) in which data and parity information are written across all of the disk drives in a so-called striping technique for improved data integrity.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
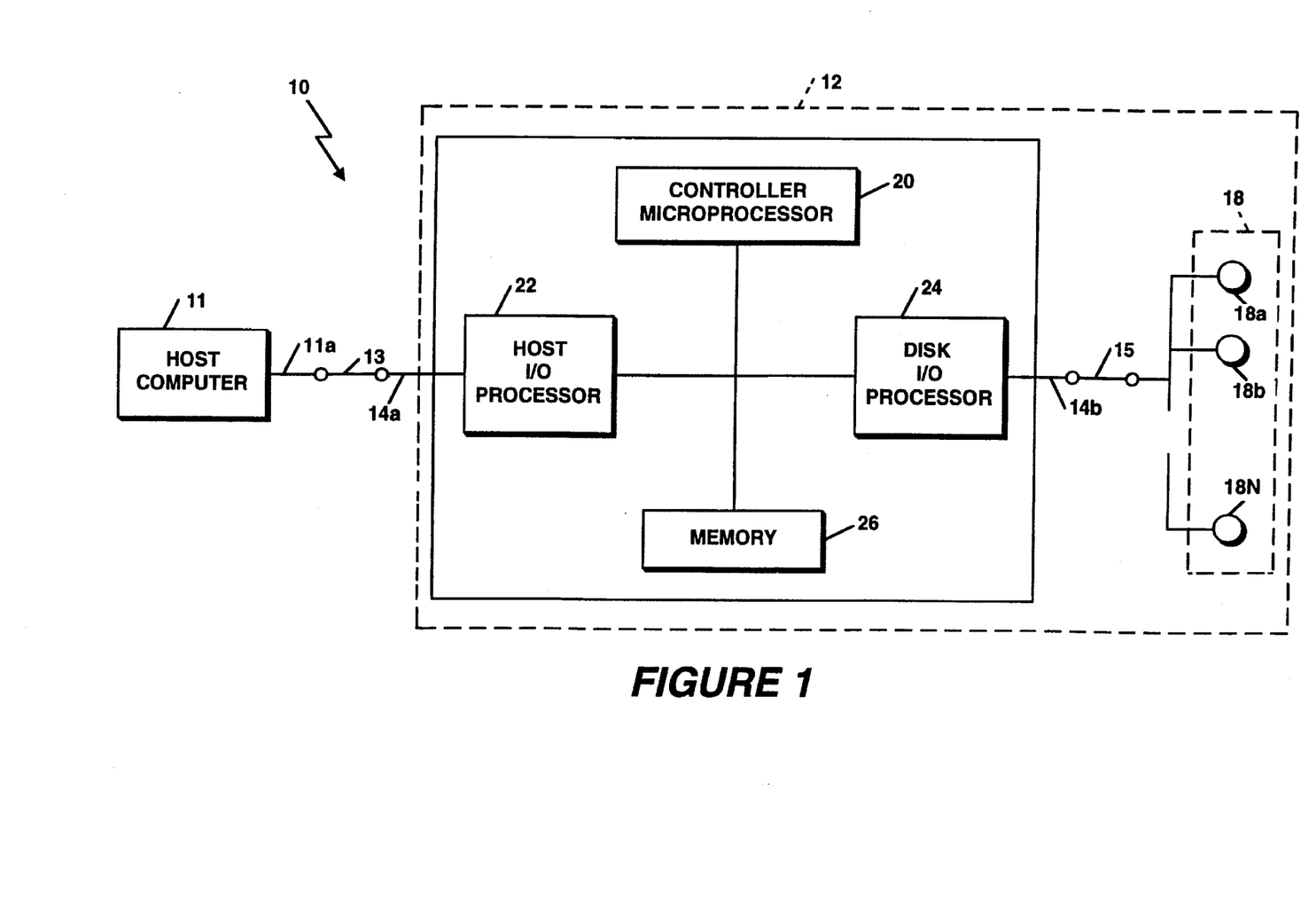
FIG. 1 is a block diagram of a computer system including a host controller coupled to a disk storage subsystem.

Referring now to FIG. 1 a computer system 10 includes a host computer 11 coupled to a disk storage subsystem 12 through a host bus 13. The disk storage subsystem 12 includes a disk controller 14 coupled to one or more disk drives 18a-18N generally referred to as disks 18. The disk drives 18a-18N may be arranged as a redundant array of inexpensive disks (RAID).

In this particular embodiment, the host bus 13 is provided as a small computer system interface (SCSI) bus and thus host port 11 is of a type adapted to couple to a first end of the SCSI bus 13. Similarly, an input/output (I/O) port 14a of the disk controller 14 is adapted to couple to a second end of the SCSI bus 13.

Disk controller 14 has a second I/O port 14b coupled through a disk bus 15 to the disk drives 18. The disk bus 15 may also be a SCSI bus.

Disk controller 14 includes a controller microprocessor 20 which may be provided, for example, as the type manufactured by Motorola and identified as part number 68030.

Those of ordinary skill in the art will recognize, of course that other microprocessors may also be used. The controller microprocessor 20 is coupled to a host I/O processor 22 and a disk I/O processor 24. In this particular embodiment, each of the I/O processors 22, 24 include a small computer system interface (SCSI) circuit to couple, respectively, to the host and disk SCSI buses 13, 15. Host I/O processor 22 and disk I/O processor 24 may be provided, for example, as the type manufactured by NCR Corporation and identified as part number NCR 53C710. Those of ordinary skill in the art will appreciate that any processor having equivalent electrical and functional characteristics may of course also be used.

The controller microprocessor 20 is also coupled to a memory 26 which in this particular embodiment is provided as a cache memory 26. The controller microprocessor 20 transmits and receives control and command signals to and from the I/O processors 22, 24. The host and disk I/O processors 22 and 24 transmit and receive information to and from the cache memory 26.

The data transfers between the host computer 11 and the disk storage subsystem 12 are controlled by the disk controller 14. All data which is the subject of a data transfer between the host computer 11 and the disk storage subsystem 12 is stored in the cache memory 26. Thus when host computer 11 initiates a write operation, the data is first written to the cache memory 26 and then to the appropriate disk drives 18.

Similarly, when host computer 11 requests data, the host I/O processor 22 first determines if the requested data is stored in the memory 26. If the data is not stored in the memory 26, then the data is retrieved from the appropriate one or ones of the disk drives 18, stored in memory 26 and provided to the host computer 11. With this technique, the disk controller 14 maintains in the cache memory 26 a copy of the data transferred between host computer 11 and disk drives 18. Thus, when the host computer 11 requests information, if the information is stored in the memory 26 the information may be rapidly retrieved from the memory 26 thereby avoiding the necessity of accessing the disk drives 18 which are slower than the memory 26.

In conventional systems, when the host computer 11 executes a write to disk command, a relatively large amount of time is required to write the data both to the cache memory 26 and to the disk drives 18. This is due in part to the fact that the controller microprocessor 20 is involved on an ongoing manner in the data retrieval and storage steps.

In the present embodiment before a data transfer between the host computer 11 and the disk drives 18 occurs, the controller microprocessor 20 establishes separate command streams for the host I/O processor 22 and the disk I/O processor 24 and stores the respective command streams in predetermined locations of the memory 26.

After the controller microprocessor 20 generates the command streams, the controller microprocessor 20 no longer involves itself with the actual transfer of data between the host computer 11 and the disk drives 18. Rather, the host processor 22 transfers information to the controller memory 26 and the disk processor 24 transfers data to the appropriate disk drives 18 by executing the appropriate command stream and without receiving additional instructions from the controller microprocessor 20. Thus, the operations necessary to accomplish a write-to-disk command are performed by the host I/O processor 22 and the disk I/O processor 24 without receiving ongoing instructions from the controller microprocessor 20. That is, after the controller microprocessor establishes the command streams, the controller microprocessor 20 does not explicitly initiate or direct the data movements necessary to write the data to the cache memory 26 and to the particular disk drives 18. Moreover, the I/O processors 22, 24 coordinate the data transfers without continuing intervention of the controller microprocessor 20.

The host I/O processor 22 is responsible for placing data in the memory 26 and, as will be described below in conjunction with FIG. 2, performs those steps necessary to indicate to the controller microprocessor 20 that the data is valid. Furthermore the host processor 22 controls the ability of the disk processor 24 to transfer data to the disk drives 18. Thus, with this technique, data may be rapidly transferred between the host I/O processor 22 and the disk I/O processor 24 and consequently between the host computer 11 and the disk drives 18.

By having the I/O processors 22, 24 execute the command streams established by the controller microprocessor 20, the transfer of data from the host 11 to the memory 26 and the transfer of data from the memory 26 to the disk drives 18 can be performed rapidly and without any further intervention or involvement by the controller microprocessor 20. Thus, the I/O processors 22, 24 effectively form an I/O processor pipeline. That is, the data is pipelined through the memory 26 from the host I/O processor 22 to the disk I/O processor 24.

In general overview, the I/O pipeline is provided in the following manner. After transferring a block of data to the memory 26, the host I/O processor 22 provides an indicator to the disk I/O processor 24 that the data is available to be transferred to the disk drives 18. The disk I/O processor 24 then transfers the data from the memory 26 to the disk drives 18 independently of the controller microprocessor 20 and the host I/O processor 22. Since the operations of receiving the data from the host computer 11 and transferring the data to the disk drives 18 may take place in rapid succession the present technique minimizes the latency period between the receipt of data from the host computer 11 and the subsequent transfer of the data to the disk drives 18.

As mentioned above, in this particular embodiment, the host processor 22 and disk processor 24 may each be provided as the type manufactured by NCR Corporation and identified as part number NCR 53C710. These particular processors execute series of instructions which are generally referred to as scripts.

The host and disk I/O processors 22, 24 are functionally enabled to move information into predetermined locations of the memory 26 and are also functionally enabled to move data between particular memory locations within the memory 26. Thus, the I/O processors 22, 24 can essentially perform three operations. First, the processors 22, 24 can transfer data from the respective SCSI buses 13, 15 to the cache memory 26; second, the processors 22, 24 can transfer data from the cache memory 26 to the respective SCSI buses 13, 15; and third, the processors 22, 24 can move data between memory locations in the cache memory 26.

By having the host and disk I/O processors 22, 24 execute scripts which allow the processors 22, 24 to move data between memory locations of the memory 26 and the disk drives 18, the controller microprocessor 20 is not burdened with the responsibility of coordinating the movement of data blocks into the cache memory 26 or into the disk drives 18.

As mentioned above, after initially storing command streams formed by script instructions for both the host and disk I/O processors 22, 24 in the memory 26, the controller microprocessor 20 is not involved in coordinating the movement of data between the host and disk I/O processors 22, 24. It is necessary therefore to guarantee the proper sequencing of operations between the host and disk processors 22, 24. Thus, in the present embodiment, the ability of the I/O processors 22, 24 to move data between memory locations, is advantageously used to alter instructions performed by each of the processors 22 and 24 and thereby control the sequencing of host and disk processor operations.

As will be described in more detail in conjunction with FIGS. 2 and 2A below, proper sequencing between the host processor 22 and disk processor 24 is achieved through the use of self modifying code. That is the host processor 22 modifies the scripts executed by the disk processor 24. Specifically, prior to the disk I/O processor 24 transferring data from the memory 26 to the disk drives 18, a particular portion of a script executed by the disk I/O processor 24 must be modified by the host I/O processor 22. Once the portion of the script of the disk I/O processor 24 is appropriately modified by the host I/O processor 22, the disk I/O processor 24 is able to transfer data to the appropriate disk drives 18. With this particular technique the host I/O processor 22 and the disk I/O processor 24 are properly sequenced. In a worst case scenario, the disk I/O processor 24 is ready to transfer data but must wait for the host I/O processor 22 to transfer one block of data before the disk I/O processor 24 can complete the write-to-disk.

In the present embodiment, the blocks are generally the block size of the host computer. For example, if the host computer is an IBM AS/400, the block size corresponds to 520 bytes on the host side of the disk controller 14 and 524 bytes on the disk side of disk controller 14. The extra four bytes, on the disk side in this example are optionally provided for a longitudinal check sum.

Initially, the host processor 22 is set up to receive commands. That is, the host I/O processor 22 is executing particular instructions (i.e. scripts) and receiving commands from the SCSI bus 13 and from the controller microprocessor 20. For example, the host processor 22 may receive a write command.

Upon retrieval of a write command from the host bus, the host processor 22 then generates an interrupt signal which is fed to the controller microprocessor 20. The controller 20 receives the interrupt signal and prepares the disk I/O processor 24 to execute particular scripts to send commands and transfer data. Thus the controller microprocessor 20 prepares the disk I/O processor 24 to transfer data prior to the time when the actual data transfer occurs.

Before the data can actually be written onto one of the disk drives 18, the disk head of the disk drive 18 must physically move over the disk to the appropriate disk location. That is, a disk seek occurs. This disk seek may occur while the data is being transferred from the host computer 11 to the memory 26. Thus, the disk seek and a data transfer between the host computer 11 and the host I/O processor 22 may be performed in parallel. When the host I/O processor 22 modifies the appropriate script of the disk I/O processor 24 to indicate that the data to be written to disk is available in memory and the disk I/O processor 24 may then begin transferring data to the disks 18.

It should be noted, however, that the transfer of data to the disk drive 18 does not depend upon the seek being complete. Since data to be written to disk may be temporarily stored in a buffer memory within the respective disk drives 18 prior to the storage of such information on the disk 18 media.

Thus, the controller processor 20 prepares and executes scripts on the host I/O processor 22 to direct memory access (DMA) data to the memory 26 and also to notify the disk I/O processor 24 after every data block is transferred. That is, a validation of the data transfer between the host I/O processor and the memory 26 is performed. Thus, from the point of view of the controller processor 20, the host and disk processors 22, 24 can operate independently without ongoing intervention from the controller microprocessor 20. Before the controller microprocessor 20 is again notified and required to provide instructions, all of the data is already in the memory 26 and being written to drives 18.

The host I/O processor 22 thus merely notifies the controller microprocessor 20 that the DMA is complete. That is, the host processor 22 notifies the host bus 13 that it is now available to perform another operation. In this manner, the controller microprocessor 20 is available to perform other operations which leads to more efficient processing in the disk controller 14 and the computer system 10.

Finally, the disk I/O processor 24 notifies the controller microprocessor 20 that the disk write is complete. After being notified that the disk write is complete, the controller microprocessor 20 prepares and executes commands to return the status of the host I/O processor 22 to the host computer 11.

As mentioned above, since the controller microprocessor 20 is no longer explicitly controlling the transfer of data between host I/O processor 22 and the memory 26 or the transfer of data between the memory 26, the disk I/O processor 24, and the disk drives 18, on an ongoing basis it is important to guarantee proper sequencing between the host I/O processor 22 and the disk I/O processor 24 without involving the controller microprocessor 20. Thus, the host I/O processor 22 is used to control the time at which the steps are executed by disk I/O processor 24.

In this particular embodiment, this control process is performed by having the host I/O processor 22 modify the contents of a particular location in the memory 26. The memory location which is modified affects the command stream of the disk I/O processor 24. More specifically, the disk I/O processor 24 executes a jump command in accordance with the contents of the particular memory location in the memory 26. When the contents of the particular memory location correspond to a first predetermined value, the disk processor 24 essentially enters a waiting mode in which the disk processor 24 continually executes a loop. However, when the contents of the particular memory location correspond to a second predetermined value then the disk processor 24 exits the loop and is able to perform functions such as transferring data to the disk drives 18. Thus, when the contents of the memory location correspond to the first predetermined value the disk I/O processor 24 executes a first predetermined set of instructions. However, after the host I/O processor 22 modifies the contents of the predetermined memory location to correspond to the second different predetermined value, the disk I/O processor 24 executes a second predetermined set of instructions.

The host processor 22 changes the value stored in the predetermined memory location when data is ready to be transferred to the disk. The host I/O processor 22, therefore, effectively modifies the instruction stream (i.e. the scripts) executed by the disk I/O processor 22. Thus, the host I/O processor 22 controls the time at which the disk I/O processor 24 executes certain steps and such control is performed without the aid of the controller processor 20.

That is, the controller processor 20 does not actively control the sequencing of the processors 22 and 24. Rather, the sequencing of the processors 22, 24 is accomplished directly between I/O processors 22 and 24 without continuous intervention of the controller processor 20. It should thus be noted that the processors 22, 24 operate sequentially and cannot get out of sequence.

Furthermore, the controller processor 20 is not burdened with the responsibility of controlling the particular time data blocks are moved into memory 26 or when the data blocks are moved into the disk drives 18. Moreover, with this technique a DMA transfers between the host I/O processor and the cache memory and DMA transfers between the cache memory and the disk I/O processor may occur in parallel.

Figure 2:
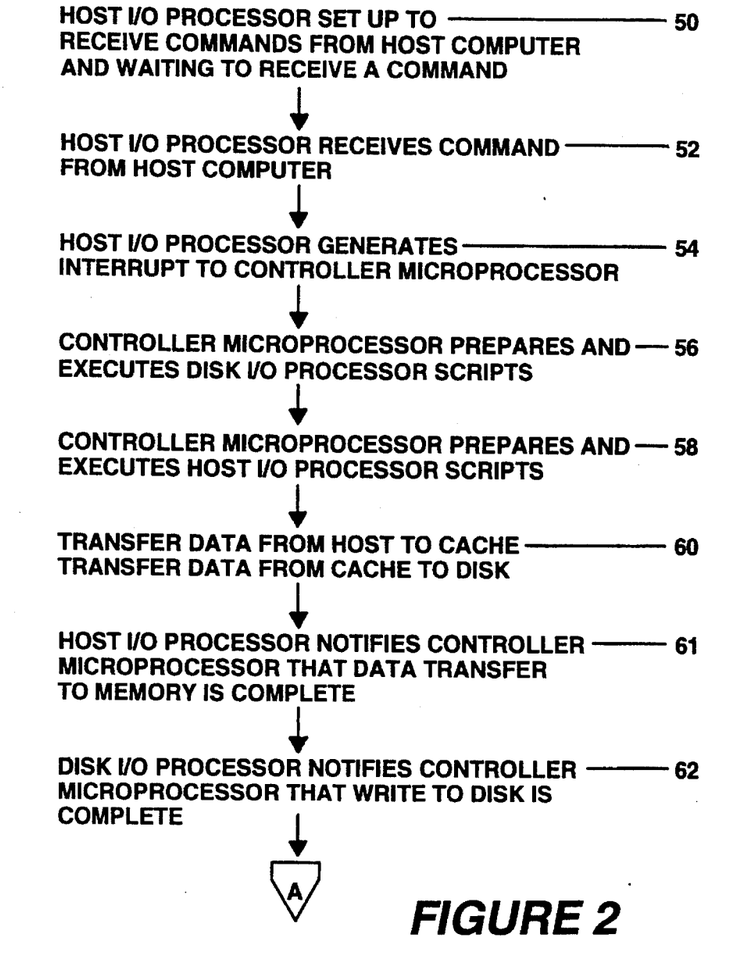
FIGS. 2 and 2A are flow diagrams showing the steps required to transfer data from a host computer to a disk storage subsystem.
Figure 2A:
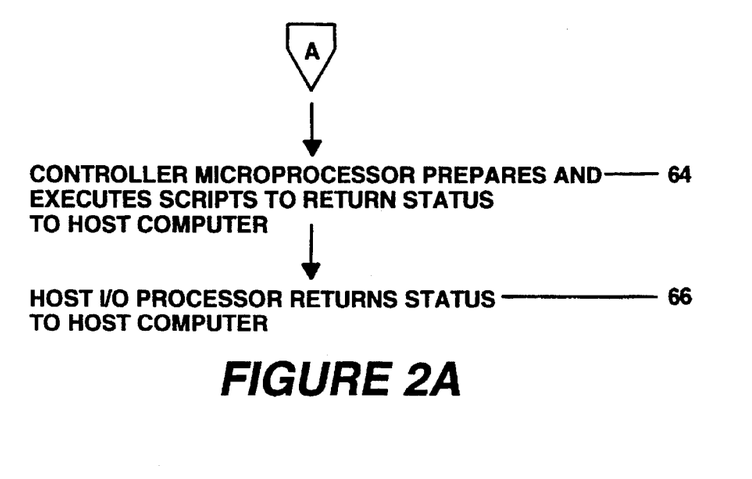

FIG. 2 shows a flow diagram of the method employed in disk controller 14 to transfer data between the host computer 11 and the disks 18 within the disk storage subsystem 12. In FIG. 2, as shown in processing block 50 the host I/O processor 22 is initially in a wait mode in which the host I/O processor 22 monitors the host bus 13 and waits to be selected to perform some function. For example, when the bus 13 is a SCSI bus, the host I/O processor 22 examines an identification code (ID) on the SCSI bus 13 to determine if its host I/O processor ID has been selected.

Once a proper ID is received by the host I/O processor 22 then processing continues to step 52 in which the host I/O processor 22 retrieves a command from the host computer 11 via the bus 13. The host I/O processor 22 receives the command and then generates an interrupt to the controller microprocessor 20. The controller microprocessor 20 determines the amount of data to be transferred from the host computer 11 to the disk drives 18 based upon the information provided to the host I/O processor by the host computer.

Next, as shown in steps 56 and 58 the controller microprocessor 20 prepares and executes the disk and host I/O processor scripts. For example, if the host I/O processor 20 notifies the controller microprocessor 20 that a single block of data is to be transferred from the host computer 11 to the disk drives 18, then the controller microprocessor 20 prepares and executes scripts for the host I/O processor 22 which permits the host I/O processor 22 to transfer one block of data from the host computer 11 to the cache memory 26. Similarly, the controller microprocessor 20 prepares and executes scripts for the disk I/O processor 24 which permits the disk I/O processor 24 to transfer one block of data from the cache memory 26 to the disk drives 18.

The order in which the scripts are prepared and executed by the controller microprocessor 20 depends upon the command which the host I/O processor 22 receives from the host computer 11. For example, if the host I/O processor 22 receives a "write" command from the host computer 11, then the controller microprocessor 20 prepares and executes the scripts for the disk I/O processor 24 before preparing and executing scripts for the host I/O processor 22.

After the controller microprocessor 20 has prepared and executed the scripts for the host and disk I/O processors 22, 24, the host and disk I/O processors 22, 24 function independently without requiring any further intervention from the controller microprocessor 20. Thus, as shown in step 60, the host and disk I/O processors 22, 24 control the transfer of data from the host computer 11 to the cache memory 26 as well as the transfer of data from the cache memory 26 to the disk drives 18.

As shown in steps 61 and 62 after the transfers between the host computer 11 and cache 26 and between the cache memory 26 and the disk drives 18 are complete the host and disk I/O processors 22, 24 respectively notify the controller microprocessor 20 that the transfers are complete. The order in which the host and disk I/O processors 22, 24 notify the controller microprocessor 20 will depend upon the command initially provided by the host computer 11.

For example, assuming that the host computer 11 issues a "write" command, then the host I/O processor 22 will complete the transfer of data from the host computer 11 to the cache memory 26 before the disk I/O processor 24 completes the transfer of data from the cache memory 26 to the disk drives 18. Thus, as shown in step 61, once the data transfers between the host computer 11 and the host I/O processor 22 are complete, the host I/O processor 22 notifies the controller processor 20 that the host bus 13 and the host I/O processor are now available to perform other operations. Accordingly, the host I/O processor 22 may begin performing new operations while the disk I/O processor 24 is completing the write to disk.

Subsequently, as shown in step 62, after the disk I/O processor 24 completes the transfer of data from the cache memory 26 to the disk drives 18 the disk I/O processor 22 notifies the controller microprocessor 20 that the write to disk is complete.

It should be noted, however, that if the host computer 11 issues a "read" command, then the disk I/O processor 24 will complete the transfer of data from the disk drives 18 to the cache memory 26 before the host I/O processor 22 completes the transfer of data from the cache memory 26 to the host computer 11. Thus, the disk I/O processor 24 will notify the controller microprocessor 20 that it has completed the transfer before the host I/O processor and therefore the disk bus 15 and disk I/O processor 24 are available to perform other operations while the host I/O processor 22 completes the appropriate data transfers.

After the host and disk I/O processors 22, 24 have notified the controller microprocessor 20 that the data transfers are complete, then as shown in step 64 the controller microprocessor prepares and executes scripts for the host I/O processor 22 such that the host I/O processor 22 can return the status of the operation to the host computer 11 as shown in step 66.

Figure 3:
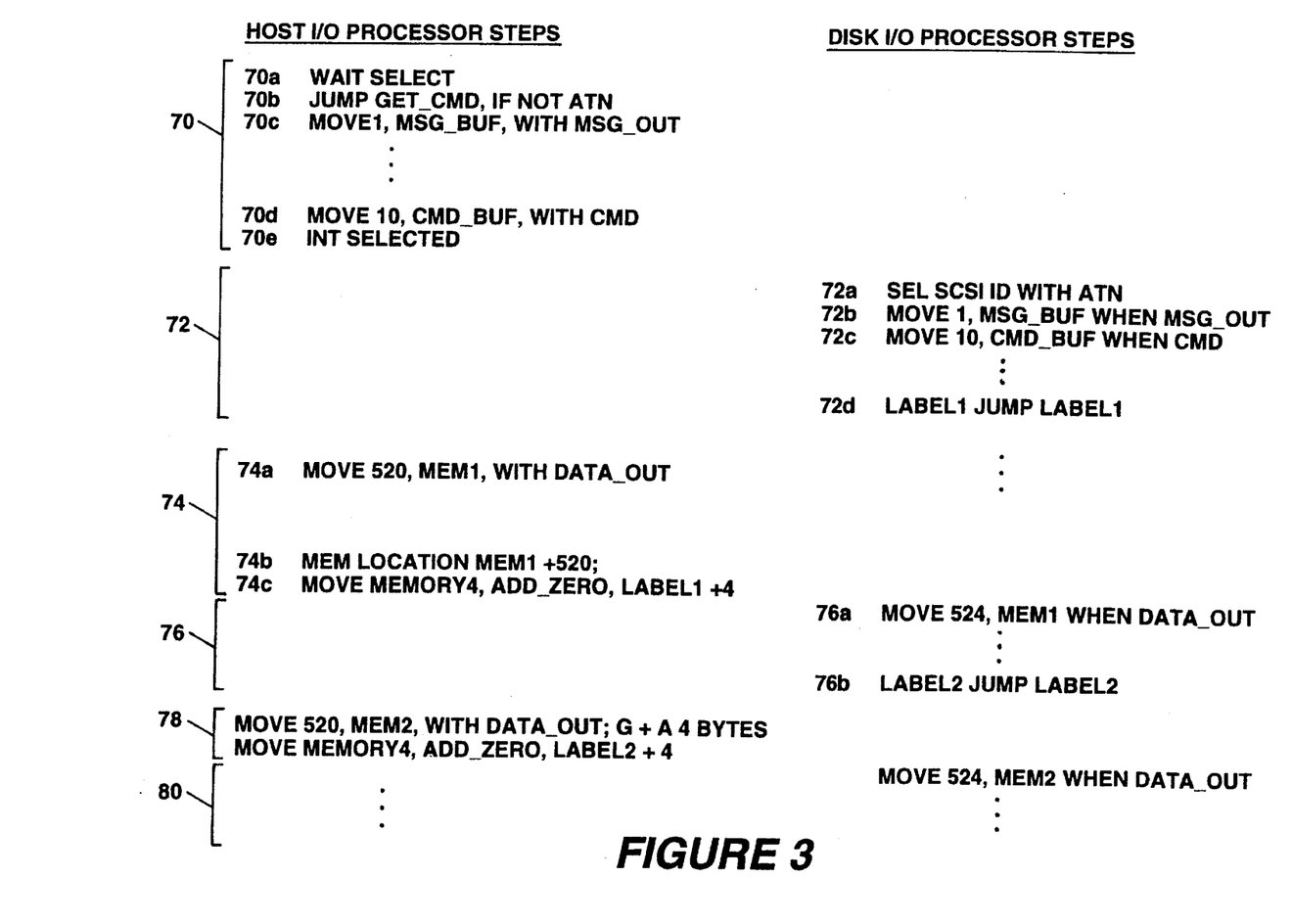
FIG. 3 is a diagrammatical representation of the steps performed by the host and disk I/O processors.

FIG. 3 is a diagrammatical representation of pseudo-code showing the order in which the host and disk I/O processors 22, 24 execute their respective command streams. In the following description of FIG. 3, it is assumed that the buses 13 and 15 (FIG. 1) are SCSI buses and that the host and disk I/O processors 22, 24 (FIG. 1) are of the type or similar to the type manufactured by NCR corporation and identified as part number 53C710.

As shown in step 70a, the host I/O processor executes a wait select script in response to which the host I/O processor 22 examines an identification code (ID) on the SCSI bus 13 to determine if its host I/O processor ID has been selected. The host I/O processor 22 will not respond to any data on the bus 13 until its ID has been selected.

Once the host I/O processor recognizes that its ID is selected, processing continues to step 70b where a jump command is executed. The jump command 70b causes the host I/O processor 23 to retrieve the command on the SCSI bus if the host computer 11 has not set the attention flag ATN. If the host computer 11 sets the ATN flag during the transfer of the command bytes, then an interrupt to the controller microprocessor 20 will occur and the command will not be retrieved from the SCSI bus.

If the jump command 70b is successfully executed, then as shown in step 70c, 1 byte of data is moved from the initiator-host computer 11 into a message buffer msg_buf. The first byte is decoded to determine the number of SCSI command bytes to receive. The command length (determined by the number of command bytes to be received) is then stored in a register of the host I/O processor 22. The SCSI bus phase (i.e. a particular bit pattern on the SCSI bus) has been specified as msg_out, thus the bus controller must assert signals corresponding to this phase onto the bus 13. In SCSI operation, the controller of the bus protocol is the target of the operation rather than the initiator of the operation. This results because the initiator relinquishes control to the target after starting the operation. The target must place the expected phase on the bus to continue operation and thus the target is the controller of the bus.

As shown in step 70d, assuming that 10 command bytes are to be received, these 10 command bytes are moved into a target buffer here designated CMD_BUF and a predetermined SCSI phase CMD is placed on the bus. The SCSI phase indicates the type of data to be transferred (e.g. SCSI commands, data, message or status).

Then as shown in step 70e an interrupt to the controller microprocessor is generated. In response to the interrupt, the controller microprocessor 20 reads the status of registers in the host I/O processor 22 to determine that command bytes have been placed in memory 26 at a predetermined location by host I/O processor 22. Then as described above in conjunction with FIG. 2, the controller microprocessor 20 prepares the scripts for both the host and disk I/O processors 22, 24 and stores such script in memory and causes the respective I/O processors to initiate execution of such scripts.

As shown in steps 72a–72c, in a manner similar to the host I/O processor, 22 the disk I/O processor 24 selects the SCSI ID and moves a predetermined number of command bytes, here shown to be 10 command bytes into a command buffer CMD_BUF.

Then as shown in step 72d the disk I/O processor implements a jump to LABEL1 command and thus enters a loop. During execution of this command the contents of the memory location identified as LABEL1 are used as an offset. Assuming in the present example that each opcode is 4 bytes, then the script corresponding to JMP LABEL1 is 8 bytes total. Thus by setting the offset provided by LABEL1 to minus eight (−8) the JMP LABEL1 command becomes a jump to itself and the disk I/O processor 29 simply executes a continuous loop. In this manner, the disk I/O processor 24 is placed in a wait loop. The disk I/O processor 24 remains in this wait loop until the value of LABEL1 is changed by the host I/O processor.

Assuming that a single block of data corresponding to 520 bytes is to be written to disk, then as shown in step 74a the data is moved from the host computer 11 to memory location MEM1 of the memory 26 when a SCSI bus phase DATA_OUT is placed on the bus by host I/O processor 22. Next as shown in optional step 74b a 4 bit longitudinal checksum is appended to the data block. Finally as shown in step 74c the host I/O processor 22 changes the contents of the LABEL1 memory location from minus eight (−8) to zero. Thus, the JMP LABEL1 command of step 72d executed by the disk I/O processor 24 no longer jumps to itself and thus the waiting loop 72d is terminated.

As shown in step 76a the disk I/O processor 24 then moves the 524 byte data block (520 bytes data+4 byte checksum) from the MEM1 location of the memory 26 to the appropriate disk drives 18.

These steps are repeated as shown in steps 78 and 80 until all of the data is transferred from the host computer 11 to the disk drives 18.

Having described preferred embodiments of the invention, it will be apparent to those of ordinary skill in the art that other embodiments incorporating the inventive concepts may be employed. Accordingly, these embodiments should be viewed as exemplary and the invention should be limited only by the scope and spirit of the appended claims.

What is claimed is:

1. A disk controller, adapted to couple a host computer to a disk drive, the disk controller comprising:

a controller microprocessor;

a memory;

a host processor adapted to couple to the host computer, said host processor coupled to said controller microprocessor and to said memory, said host processor for transferring data to said memory and for receiving data from said memory; and a disk processor adapted to couple to the disk drive, said disk processor coupled to said controller microprocessor and to said memory, said disk processor for transferring data to said memory and for receiving data from said memory wherein in response to a predetermined command generated by the host computer, said host processor transfers information to said memory and said disk processor transfers data from said memory to the disk drive wherein said host processor controls when the disk processor transfers the data to the disk drive.

2. The disk controller of claim 1 wherein said memory is a cache memory.

3. The disk controller of claim 2 wherein:

said host processor is adapted to couple to a small computer system interface bus; and said disk processor is adapted to couple to a small computer system interface bus.

4. The disk controller of claim 1 wherein said disk processor executes the predetermined command at a predetermined time and said host processor modifies the predetermined command executed by said disk processor such that said disk processor transfers data to the disk drive.

5. The disk controller of claim 4 wherein said host processor controls a sequence of data transfers between said host processor and said memory and controls a sequence of data transfers between said disk processor and the disk drive by storing a predetermined number in a predetermined memory location of said memory.

6. The disk controller of claim 5 wherein the predetermined memory location of said memory has stored therein a value which modifies an execution sequence of said disk processor.

7. The disk controller of claim 6 wherein said memory has stored therein at least one of:

a script;

a command buffer; and a status indicator.

8. The disk controller of claim 1 wherein when said memory has a first value stored in a predetermined memory location, said disk processor executes a first set of instructions and when the predetermined memory location of said memory has stored therein a second value, said disk processor executes a second different set of instructions.

9. The disk controller of claim 8 wherein:

the first set of instructions executed by said disk processor in response to the predetermined memory location of said memory having stored therein the first value correspond to a wait mode; and the second set of instructions executed by said disk processor in response to the predetermined memory location of said memory having stored therein the second value correspond to a data transfer mode.

10. The disk controller of claim 9 wherein after said host processor transfers data to said memory, said host processor changes the contents of the predetermined memory location of said memory from the first value to the second value.

11. A disk storage subsystem comprising:
   at least one disk drive; and
   a disk controller coupled to said disk drive and adapted to couple to a host computer, said disk controller comprising:
   a controller microprocessor;
   a memory;
   a host processor adapted to couple to the host computer, said host processor coupled to said controller microprocessor and to said memory, said host processor for transferring data to said memory and for receiving data from said memory; and
   a disk processor adapted to couple to the disk drive, said disk processor coupled to said controller microprocessor and to said memory, said disk processor for transferring data to said memory and for receiving data from said memory wherein in response to a predetermined command generated by the host computer, said host processor transfers information to said memory and said disk processor transfers data from said memory to the disk drive wherein said host processor controls when the disk processor transfers the data to the disk drive.

12. The disk storage subsystem of claim 11 wherein said at least one disk drive is a first one of a plurality of disk drives each of said plurality of disk drives coupled to said controller.

13. The disk storage subsystem of claim 12 wherein said plurality of disks are coupled to provide a redundant array of inexpensive disks and data and parity information is written across all of the disk drives.

14. The disk storage subsystem of claim 13 wherein said memory is a cache memory.

15. The disk storage subsystem of claim 14 wherein:
   said host processor is adapted to couple to a small computer system interface bus; and
   said disk processor is adapted to couple to a small computer system interface bus.

16. The disk storage subsystem of claim 11 wherein said disk processor executes the predetermined command at a predetermined time and said host processor modifies the predetermined command executed by said disk processor such that said disk processor transfers data to the disk drive.

17. The disk storage subsystem of claim 16 wherein said host processor controls a sequence of data transfers between said memory and the disk drive by storing a predetermined number in a predetermined memory location of said memory.

18. The disk storage subsystem of claim 17 wherein when the predetermined memory location of said memory has stored therein a first value, said disk processor executes a first set of instructions and when the predetermined memory location of said cache memory has stored therein a second value, said disk processor executes a second different set of instructions.

19. The disk storage subsystem of claim 18 wherein in response to the predetermined memory location of said memory having stored therein the first value said disk processor enters a wait mode and in response to the predetermined memory location of said memory having stored therein the second value said disk processor enters a data transfer mode.

20. A method of operating a disk storage subsystem comprising the steps of:
   receiving a command from a host computer in a host processor wherein the command requires a data transfer to take place between the host computer and the disk storage subsystem;
   generating an interrupt from the host processor to a controller microprocessor;
   determining an amount of data to be transferred between the host computer and the disk storage subsystem;
   preparing, in the controller microprocessor, a host processor command stream for the host processor;
   preparing, in the controller microprocessor, a disk processor command stream for the disk processor;
   storing the host processor and disk processor command streams in predetermined memory locations of a memory;
   executing the host processor command stream to transfer data from the host computer to the memory; and
   executing the disk processor command stream to transfer data from the memory to the disk drive wherein execution of the host processor command stream modifies the disk processor command stream to control a sequence in which the host and disk processors transfer data.

21. The method of claim 20 wherein the step of executing the disk processor command stream to transfer data from the memory to the disk drive and modifying the disk processor command stream to control the sequence in which the host and disk processors transfer data further comprises the step of placing the disk processor in a wait mode.

22. The method of claim 21 wherein the step of modifying the disk processor command stream includes the step of the host processor moving a predetermined value into a particular memory location of the memory such that the disk processor terminates the wait mode and enters a data transfer mode.

23. The method of claim 22 wherein when the disk processor enters the wait mode the disk processor executes the steps of executing an infinite loop.

24. The method of claim 22 wherein in response to the host processor moving the predetermined value into the particular memory location of the memory, the disk processor begins executing a next sequential command in the host processor command stream.

25. A method of transferring data from a host computer to disk drives within a disk storage subsystem including a host processor, a disk processor, a controller microprocessor, a memory and said disk drives, the method comprising the steps of:
   the host processor retrieving a command;
   the host processor providing an interrupt signal to the controller microprocessor;
   the controller microprocessor preparing and executing command streams for the host processor and the disk processor wherein the disk processor command stream places the disk processor in a wait mode;
   the host processor moving data to the memory;
   the host processor changing a first value in a particular memory location in the memory to a second different value;
   in response to the host processor changing the first value in the particular memory location in the memory to the second different value, the disk processor entering a data transfer mode; and moving data from the memory to at least one of said disk drives after the disk processor enters the data transfer mode.

26. The method of claim 25 wherein the step of moving data from the memory to at least one of said disk drives after the disk processor enters the data transfer mode includes the step of writing data and parity information across each of a plurality of disk drives coupled to provide a redundant array of inexpensive disks.

27. A method of transferring data from a host computer to a disk storage subsystem which includes a controller microprocessor, a host processor, a disk processor and a memory and a disk drive, the method comprising the steps of:

(a) reading a status indicator of the host processor;

(b) reading a status indicator of the disk processor;

(c) transferring information into a message buffer of the disk processor;

(d) determining if data can be transferred to the disk drive in response to instructions to said disk processor being modified by said host processor, wherein in response to data not being ready to be transferred to the disk drive then performing the steps of:

(i) transferring data from the host processor to the memory; and (ii) modifying a command sequence of the disk processor; and (e) repeating step (d) until the disk processor indicates that data can be transferred to the disk drive.

28. The method of claim 27 wherein in response to said indicator having a second value indicating that data is ready to be transferred to the disk storage subsystem, said disk processor performs the step of transferring data to the disk drive.

29. The method of claim 28 wherein the step of providing an indicator to indicate whether a data transfer between the disk processor and the disk drive is ready to be accomplished includes the steps of:

the host processor modifying the contents of a particular memory location; and the disk processor reading the contents of the memory location and executing a first particular instruction set in response to the contents of the particular memory location having a first value and executing a second particular instruction set in response to the contents of the particular memory location having a second different value.

30. The method of claim 29 wherein in response to a particular memory location of the memory having the first value stored therein the disk processor enters a waiting mode and in response to the particular memory location of the memory having the second value stored therein the disk processor moves data from the memory to the disk drive.

31. A method of transferring data from a host computer to disk drives within a disk storage subsystem including a host processor adapted to couple to said host computer, a disk processor adapted to couple to said disk drives, said host processor and said disk processor being coupled to a controller microprocessor, and a cache memory, the method comprising the steps of:

(a) receiving from a host computer data to be stored on at least one disk drive;

(b) storing said data in said cache memory;

(c) providing to said disk processor an indication from said host processor that said received data is stored in said cache memory by modifying contents of at least one location in said cache memory;

(d) recognizing said indication in said disk processor; and (e) writing said received data from said cache memory to said at least one disk drive in response to recognition of said indication.

* * * * *